United States Patent
Henderson et al.

[15] 3,659,579
[45] May 2, 1972

[54] COMBINED BAKING AND BROILING GAS OVEN

[72] Inventors: Wayne L. Henderson; Raymond L. Dills, both of Louisville, Ky.

[73] Assignee: General Electric Company

[22] Filed: Dec. 23, 1970

[21] Appl. No.: 100,952

[52] U.S. Cl..........................126/21 A, 126/39 C, 126/41 R, 431/329
[51] Int. Cl...................F23d 13/14, F24c 3/04, F24c 15/32
[58] Field of Search..............126/21 R, 21 A, 19, 39 R, 39 C, 126/273 R, 41 R; 431/328, 329

[56] References Cited

UNITED STATES PATENTS

| 3,151,610 | 10/1964 | Hanson et al. | 126/41 R |
| 3,437,085 | 4/1969 | Perry | 126/21 A |
| 3,528,399 | 9/1970 | Perl | 126/21 A |

Primary Examiner—Charles J. Myhre
Attorney—Richard L. Caslin, Francis H. Boos, Jr., Frank L. Neuhauser, Oscar B. Waddell and Joseph B. Forman

[57] ABSTRACT

A single cavity gas cooking oven with a combined baking and broiling gas burner mounted adjacent the top wall of the oven liner. The burner has a top baking zone and a bottom broiling zone and an adjustable valve for supplying gas either to the top zone or the bottom zone. Air channels are formed above the oven liner, down the back of the oven liner as well as beneath the oven liner. A fan in the air channels draws air in the top front and discharges it out the bottom front of the oven. An air inlet opening is formed in the top wall of the oven liner to communicate with the top air channel and supply a flow of secondary air over the burner. An oven exhaust vent is formed adjacent the bottom wall of the oven liner. A duct connects with the exhaust vent and extends across the floor of the oven liner, up the back wall and through the top wall to discharge the oven gases into the top air channel due to a venturi effect where they mix and are eventually discharged from the oven.

14 Claims, 2 Drawing Figures

Patented May 2, 1972 3,659,579

INVENTORS
WAYNE L. HENDERSON
& RAYMOND L. DILLS
BY Richard L. Caslin
THEIR ATTORNEY

COMBINED BAKING AND BROILING GAS OVEN

BACKGROUND OF THE INVENTION

The present invention is directed toward the development of a combined baking and broiling burner to be used in a single oven cooking cavity to perform both baking and broiling operations. For many years, the most common type of gas oven for the home employed a relatively large baking oven with a gas burner positioned beneath the oven liner, while there was a second, smaller, broiling oven positioned beneath the gas burner for performing broiling operations in this separate lower broiling oven. Two separate oven compartments such as this are not necessary in the electric oven art where there is generally a single oven cavity with a lower baking heating element and an upper broiler heating element. One big objection to the two separate gas oven compartments is that the lower broiling compartment is so low that it is inconvenient to work with and see into because it is generally located very near the floor and one almost has to double over at the waist in order to load, examine and unload the food being cooked therein.

The principle object of the present invention is to provide a combined baking and broiling gas burner for use in a single cooking cavity with the provision of an adjustable valve so that the burner might operate in either a baking mode or in a broiling mode.

A further object of this invention is to provide a combined baking and broiling gas oven with a single gas burner arranged in the top of the oven cooking cavity and capable of operation in either a baking mode or a broiling mode with provision being made for inducing a flow of air through the oven for first supplying secondary air to the gas burner and then sweeping the products of combustion from the oven.

SUMMARY OF THE INVENTION

The present invention, in accordance with one form thereof, relates to a gas cooking oven having an outer oven cabinet supporting both an oven liner and a front-opening access door, which in unison defines an oven cooking cavity. Air channels are formed between the oven liner and the oven cabinet at least above the oven liner, down along one vertical wall of the oven liner, and below the oven liner. Blower means within the air channel establishes a flow of ambient air through the channels and eventually discharging from the channels. A combined baking and broiling gas burner is arranged through the top wall of the oven liner. Conduit means supply a gas-air mixture to the burner. The burner is a box-like member having a horizontal divider forming a top baking zone and a bottom, radiant, broiling zone. The top zone is furnished with a plurality of gas ports at opposite sides thereof, while the bottom zone has a foraminous combustion sustaining grid which is heated to incandescent by the combustion of the gas-air mixture. An adjustable valve within the burner has one position for directing the gas-air mixture to the top zone and another position for directing the gas-air mixture to the bottom zone. An air inlet is formed in the top wall of the oven liner for supplying a portion of the air from the air channels as secondary air for the gas burner. An oven exhaust means is furnished adjacent the bottom portion of the oven which enables the discharge of the oven gases into the air channels.

BRIEF DESCRIPTION OF THE DRAWINGS

Our invention will be better understood from the following description taken in conjunction with the accompanying drawings and its scope will be pointed out in the appended claims.

DESCRIPTION OF THE PREFERRED EMBODIMENTS

Figure 1:
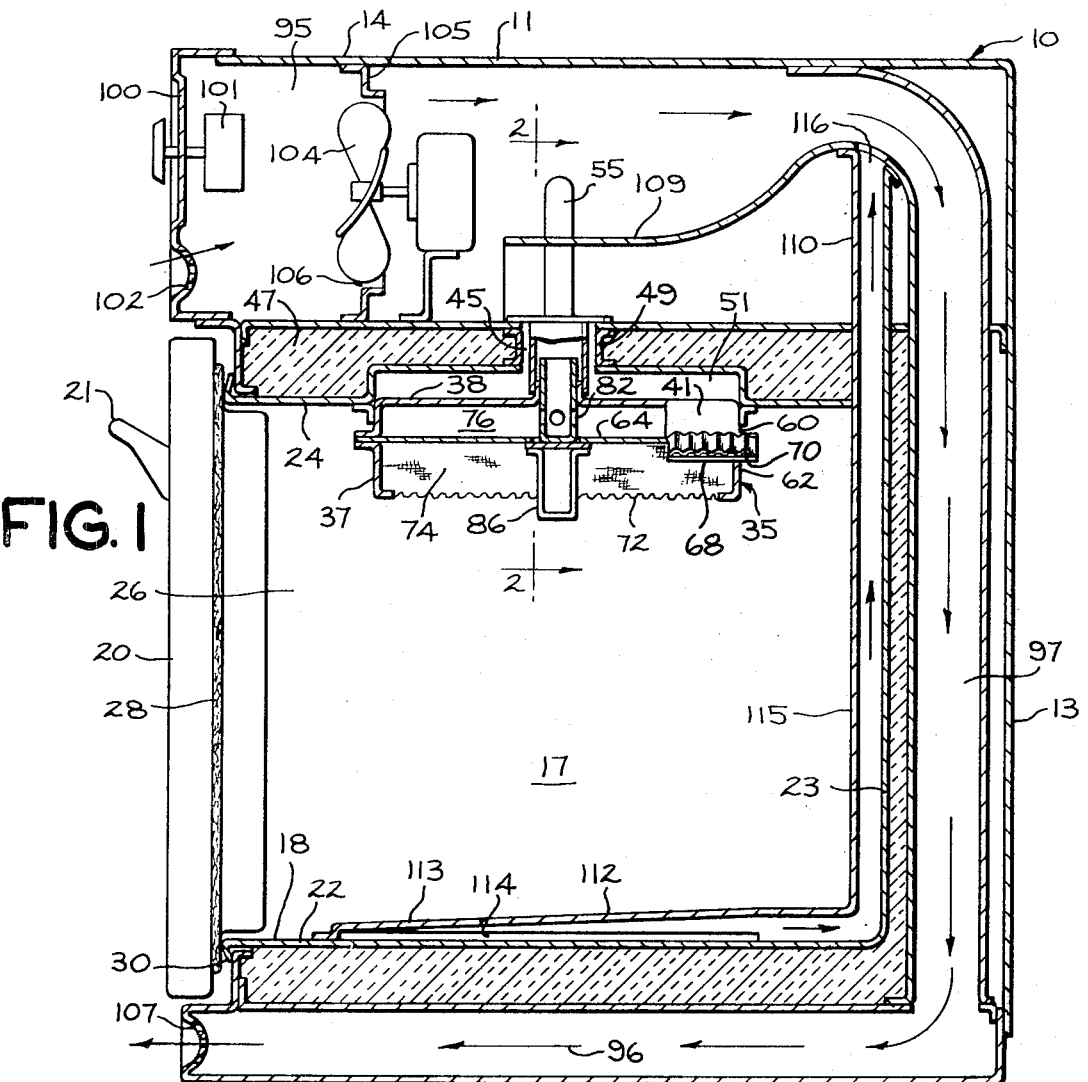
FIG. 1 is a right side elevational view of a gas oven for use as a built-in oven with some parts broken away and others in cross-section to show the layout of the oven construction as well as the nature of a combined baking and broiling gas burner in the top of the oven cavity, and the general nature of the air channels for creating an air flow through the cooking cavity as secondary air for the burner, as well as for removing the products of combustion.

Turning now to a consideration of the drawings and in particular to FIG. 1, there is shown a built-in gas oven 10 in right side elevational view comprising a sheet metal outer cabinet or body structure 11 of box-like configuration having a bottom wall 12, a back wall 13, a top wall 14; and finally opposite side walls which cannot be seen in this view. Clearly this invention could be incorporated in other oven configurations such as commercial gas-fired cooking ovens and the ovens in free-standing ranges, for example. There is an oven cooking cavity 17 formed by a box-like oven liner 18 and a front-opening access door 20. A layer of thermal insulating material 47 surrounds the outside of the oven liner. The door has a handle 21 along its top edge for ease in moving the door about its hinge axis which would be adjacent the bottom edge of the door in the normal oven design. The oven liner has a bottom wall 22, a back wall 23, a top wall 24 and opposite side walls 26, 26. The oven door 20 is shown with a door gasket 28 which is adapted to seat against the front flange 30 of the oven liner 18 for partially sealing the cooking cavity. As is standard practice, the door would come equipped with a counterbalance system (not shown) for reducing some of the weight of the door and also holding the door closed in its upright position. One important advantage that is available with the use of this invention is to have the convenience of closed-door broiling since there is a controlled flow of excess air through the cooking cavity during the broiling operations which serves to hold down the maximum temperature of the oven temperature sensing means (not shown) to prevent the oven thermostat from cycling OFF and ON during broiling.

Figure 2:
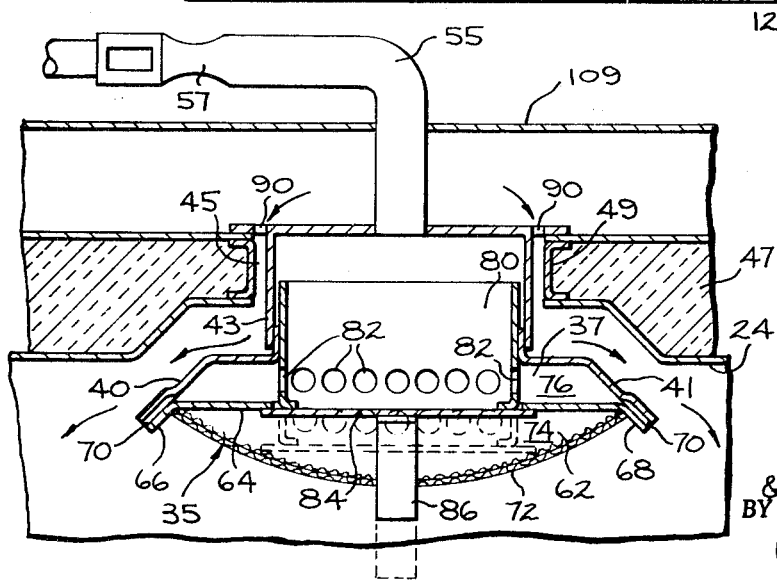
FIG. 2 is a fragmentary cross-sectional elevational view of the gas burner taken on the line 2—2 of FIG. 1 and best showing the nature of the top baking zone and the bottom broiling zone of the burner housing as well as the adjustable valve for supplying a gas-air fuel mixture to either the top or bottom zone.

A combined baking and broiling gas burner 35 of the present invention is mounted from the top wall 24 of the oven liner 18 as is seen in FIG. 1. This gas burner 35 has a box-like burner housing 37 of folded sheet metal material with a large top wall 38 having downwardly inclined opposite side edges 40, 41, as is best seen in FIG. 2 and a centrally disposed, transversely arranged, vertical duct 43 which is adapted to extend up through an oversized opening 45 formed through the top wall 24 of the oven liner and the layer of insulation 47 that is placed over the top wall. This opening 45 is shown formed of sheet metal parts such as a fabricated or channel frame 49, as is seen in both FIGURES of the drawing. Actually the top wall of the oven liner is recessed concavely as at 51 above the top wall 38 of the burner 35 so that the burner telescopes slightly therein and does not protrude very far down into the cooking cavity. A cover plate 53 is fastened over the top of the burner duct 43 and it overlies the peripheral edge of the opening 45 through the top of the oven wall.

A gas conduit 55 shown in the form of an elbow member is connected through an opening in the cover plate 53 for supplying a gas-air mixture into the duct 43. The cut-off end of the conduit 55 is shown with a venturi section 57 and an air shutter valve 58 for adjusting the air to gas fuel ratio. This, of course, is shown diagrammatically, and it is not meant to be a reproduction of the exact construction for such details are within the skill of those working in this art.

The front and rear walls of the burner housing 37 as seen in FIG. 1 are first formed with a folded-down L-shaped top strip 60 and a separate but integrally formed lower crescent-shaped section 62 (in front view) of generally Z-shape in transverse cross-section. Sandwiched between the top L-shaped flange 60 and the bottom Z-shaped section 62 is a flat, horizontal divider or partition 64 which generally divides the burner housing 37 into a top baking zone 76 and a bottom broiling zone 74. Notice in FIG. 2 that this horizontal divider 64 is formed down at its opposite side edges 66 and 68 to be generally parallel with the down-turned inclined side edges 40, 41 of the top wall 38 of the burner housing 37. These mating plates 40–66 and 41–68 have been previously corrugated throughout their lengths such that when they were fitted together and attached into position there was provided a plurality of closely spaced gas ports 70 which are substantially coextensive for the complete depth of the burner from front to back. Suspended between the front and rear crescent-shaped sections 62, 62 of the burner housing 37 are a series of layers of wire screens or diaphragms 72, which may be two or three in number and of such configurations (perhaps corrugated) that they stand off from each other rather than being of perfectly flat configuration to nest with each other. These screens 72 are bent into a bowed configuration, as is best seen in FIG. 2 to form the bottom broiling zone 74 in cooperation with the horizontal divider 64. These wire screens 72 serve as a foraminous combustion sustaining grid which becomes incandescent when heated by the gas-air mixture.

A vertical manually adjustable valve or damper 80 is formed in the burner housing 37 and it is adapted to move within the horizontal divider 64 to govern the supply of gas-air mixture to either the top baking zone 76 or the bottom broiling zone 74. This valve 80 is a vertically slidable member of rectangular tubular shape that telescopes within the duct 43 in a close-fitting relationship such that gas will not leak between the mating surfaces. This makes it possible for the gas to flow from the supply conduit 55 into the burner duct 43 and then through the valve 80. The lower skirt of the tubular valve 80 is provided with a plurality of openings 82 around the extent thereof. In the upper position of the valve 80 shown in full lines in FIG. 2, the gas is supplied to the top baking zone 76 and does not reach the bottom broiling zone 74 since the valve openings 82 are disposed above the divider 64. In the lower position of the valve 80, which is the dotted line position in FIG. 2, the valve 80 has moved downward such that the openings 82 deliver the gas to the broil zone while the valve precludes any gas from flowing into the baking zone 76. Notice that the adjustable valve 80 is provided with a bottom cover plate 84 such that all gas that enters the valve 80 must pass from the valve through the openings 82. Also notice that this bottom cover plate 84 is provided with a downwardly extending handle 86 which extends through a suitable opening in the screens 72 for facilitating the grasping of the handle and shifting the valve into either its upper baking mode or its lower broiling mode.

It is highly feasible that this vertically movable valve 80 could be replaced by a tubular, longitudinal rotatable valve formed in the plane of the divider 64.

It is necessary that this gas burner 35 be provided with secondary air passing around the outside of the burner housing 37 for complete combustion of the gases. This is provided by the use of air inlet openings 90, best seen in FIG. 2, that extend through the cover plate 53 outside the duct 43 but within the opening 45. These openings 90 should be large enough to pass a substantial amount of air down across the top of the burner housing 37 and particularly adjacent the plurality of gas ports 70 of the bake burner on the opposite sides of the burner housing 37, as is best seen in FIG. 2. This secondary air is necessary for complete combustion in both the baking mode and the broiling mode of the burner.

Some provision must be made to insure a steady flow of secondary air over the burner housing 37 and this can best be understood by referring back to FIG. 1. A forced air system is built into the oven 10. A series of air channels surround portions of the oven liner 18 outside the layer of insulation 47. For example, there is a top air channel 95, a bottom air channel 96 and a rear vertical air channel 97 connecting the top and bottom channels. This vertical air channel 97 is shown at the rear of the oven, but it could be built into one or both of the side walls of the oven cabinet 11. Above the oven door 20 is shown an oven control panel 100 which would be provided with a series of control components 101 such as an oven selector switch, an oven thermostat, an oven timer and similar convenience features. Positioned between the top edge of the oven door 20 and the lower edge of the control panel 100 is an elongated air inlet opening 102 that is covered with a suitable decorative grid or grill.

Positioned behind the control panel 100 is a motor operated intake fan 104 which is mounted in a cross partition 105 that extends from one side of the top air channel 95 to the other. The fan 104 is positioned within this partition 105 to improve the flow characteristics of the fan. An air outlet opening 107 is formed in the bottom air channel 96 adjacent the front of the oven and beneath the bottom edge of the oven door 20 such that the direction of flow through the oven is in a clockwise direction, as seen in FIG. 1, passing through the top air channel 95 down the rear air channel 97 across the bottom air channel 96 and then from the oven cabinet 11 through air outlet 107. An air scoop 109 of generally down-turned tunnel construction is fashioned over the top cover plate 53 of the gas burner 35, and this air scoop may extend from one side to the other of the top air channel 95 or it may be of somewhat reduced width. In any event, the rear-most wall 110 of the scoop 109 is closed to the air flow such that a dead air space builds up beneath the air scoop, and the scoop functions to drain off some of the air moving in the top air channel 95 and forces it through the air inlet openings 90 to create a downdraft over the top of the gas burner housing 37. This explains the method of forcing secondary air into the oven cavity 17.

Provision must also be made for exhausting the products of combustion from the cooking cavity 17. Built within the oven liner 18 is a flattened sheet metal duct work 112 that may be about an inch in height and about 6 inches in width. This duct work has a horizontal section 113 that extends across the bottom wall 22 of the oven liner from near the oven door 20 to the back wall 23. Then the duct work 112 has a vertical section 115 that climbs up the back wall 23 of the oven liner and extends up through an opening in the top wall 24 of the oven liner as well as up until it reaches the top air channel 95 where the duct is open as at 116. Looking at the opposite sides of the duct section 113 that is formed on the bottom wall of the oven liner, elongated slots 114 are formed in the opposite sides of the duct to serve as oven exhaust vent openings; and they are fashioned to avoid the passage of food soil or grease splatter into the vent slots. This design of the exhaust duct 112 is to create a venturi effect at the discharge end 116 where it empties into the top air channel 95, such that secondary air is not only forced down through the air openings 90 into the cooking cavity 17 by the intake fan 104 and air scoop 109, but air is also drawn out of the cooking cavity 17 by the venturi effect of the exhaust duct work 112.

Modifications of this invention will occur to those skilled in this art, therefore it is to be understood that this invention is not limited to the particular embodiments disclosed, but that it is intended to cover all modifications which are within the true spirit and scope of this invention as claimed.

What is claimed as new and desired to be secured by Letters Patent of the United States is:

1. A combined baking and broiling gas burner comprising a box-like housing having a central partition forming a top chamber for use during baking and a bottom chamber for use during broiling, conduit means for supplying a gas-air fuel mixture to the burner housing, there being an adjustable damper for supplying the fuel mixture either to the top baking chamber or to the bottom broiling chamber, the top baking chamber having a plurality of ports on the opposite sides thereof, the bottom of the housing having a large opening for the bottom broiling chamber, a foraminous combustion sustaining member fitted over the said large opening to form an incandescent diaphragm.

2. A combined baking and broiling gas burner as recited in claim 1 wherein the said adjustable damper communicates with the said fuel conduit means, said damper being a sliding member mounted for movement in the central partition of the burner housing, the said damper having openings in the walls thereof which may alternately be brought into communication with the baking chamber or the broiling chamber.

3. An alternate baking and broiling gas burner adapted for mounting in the top portion of a single baking and broiling oven compartment, said burner comprising an inverted box-like housing with an open bottom portion, a horizontal partition dividing the housing into a top chamber that is adapted to supply the heat for baking and a bottom chamber that is adapted to supply the heat for broiling, a plurality of ports in the opposite sides of the top chamber, and a radiant grid fitted over the open bottom portion of the housing as a combustion supporting diaphragm, and an adjustable damper extending through the partition and having openings placed whereby the adjustment of the damper brings the said openings into communication with either the top baking chamber or the bottom broiling chamber, and gas conduit means associated with the adjustable damper so that the damper serves as valve means for energizing either the baking function of the burner or the broiling function.

4. An alternate baking and broiling gas burner as recited in claim 3 where the combustion supporting diaphragm is formed by a series of separated wire screens.

5. An alternate baking and broiling gas burner as recited in claim 4 wherein the adjustable damper has an operating handle extending down through the screens for facilitating the manual manipulation of the damper.

6. A combined baking and broiling gas oven comprising a cooking cavity formed by an oven liner and a front-opening access door, a layer of thermal insulation surrounding the walls of the cooking cavity, a gas burner attached to the upper wall of the oven liner, said burner having a box-like housing having a central partition forming a top chamber for use during baking and a bottom chamber for use during broiling, conduit means for supplying a gas-air fuel mixture to the burner housing, an adjustable damper having one position for supplying the fuel mixture to the top chamber and a second position for supplying the fuel mixture to the bottom chamber, the top chamber having a plurality of gas ports at the edges thereof, while the bottom of the housing has a large opening communicating with the bottom chamber, a foraminous combustion sustaining member fitted over the said large opening to form an incandescent diaphragm when heated by the gas, and air supply means in the said top wall of the oven liner for providing a draft of secondary air over the burner housing.

7. A gas oven comprising an outer cabinet and an inner cooking cavity that is formed by a box-like oven liner and a front-opening access door, a gas burner housing attached to the upper wall of the oven liner, said burner housing having a central partition dividing it into a top chamber for use during baking and a bottom chamber for use during broiling, conduit means for supplying a gas-air fuel mixture to the burner housing, an adjustable damper built into the said partition and having one position for supplying the fuel mixture to the top chamber and a second position for supplying the fuel mixture to the bottom chamber, the top chamber having a plurality of gas ports at opposite sides thereof, while the bottom of the burner housing is furnished with a large foraminous combustion sustaining member for the bottom chamber, and air supply means in the said top wall of the oven liner for providing a flow of secondary air over the burner housing.

8. A gas oven as recited in claim 7 with air movement means located within the outer cabinet but outside the oven liner, air channels formed in at least the top, bottom and across at least one of the vertical walls of the oven liner, an oven exhaust vent arranged toward the bottom portion of the oven liner, and duct means connecting the exhaust vent to the upper air channel, whereby the operation of the said air movement means causes a flow of air to pass through the air channels, as well as a portion of the air to pass through the top wall of the oven liner as secondary air for the gas burner, while the oven air passes out through the exhaust vent and discharges to the air channels.

9. A gas cooking oven comprising a box-like oven liner and a front-opening access door forming an oven cooking cavity, an outer oven cabinet surrounding the oven liner and spaced outwardly therefrom to form air channels at the top, bottom and along one vertical wall of the oven liner, blower means for moving air through the said channels, a gas burner housing attached to the upper wall of the oven liner, conduit means for supplying a gas-air fuel mixture to the burner housing, an adjustable damper formed in the burner housing in one position to create a baking mode and in a second position to create a broiling mode, air inlet means in the top wall of the oven liner communicating with the top air channel, an oven exhaust vent arranged adjacent the bottom portion of the oven liner, duct means leading from the exhaust vent and in a vertical direction to open adjacent the top air channel to create a venturi and chimney effect and cause an air flow through the cooking cavity, whereby the air flow entering the said air inlet means in the top wall of the oven liner serves as secondary air for the said gas burner.

10. A gas cooking oven as recited in claim 9 wherein the gas burner housing has a horizontal partition dividing the housing into a top baking chamber and a bottom broiling chamber, the said adjustable damper being mounted in the partition to supply fuel either into the top chamber or into the bottom chamber, the top chamber having a plurality of gas ports at the sides thereof, while the bottom of the burner housing is furnished with a foraminous combustion sustaining member communicating with the bottom chamber.

11. A gas cooking oven having an outer cabinet enclosing a box-like oven liner with an access door forming an oven cooking cavity, a combined baking and broiling gas burner mounted adjacent the top wall of the oven liner, a top section of the burner having a plurality of gas ports adjacent the sides thereof while the bottom section of the burner has a foraminous combustion sustaining member, conduit means for supplying a gas-air fuel mixture to the burner, and valve means in the burner for supplying fuel either to the top section or to the bottom section, and air inlet means in the top wall of the oven liner to supply secondary air to the gas burner.

12. A gas cooking oven as recited in claim 11 wherein the outer cabinet is spaced from the oven liner to form air channels in the top, bottom and along one vertical wall of the oven liner, air inlet openings in the front of the outer cabinet above the oven door, air outlet openings in the front of the outer cabinet beneath the oven door, intake fan means in the top air channel adjacent the said air inlet openings for creating a strong flow through the air channels, and an air scoop positioned in the top air channels for diverting some of the air flow through the said air inlet means in the top wall of the oven liner, and an oven exhaust vent adjacent the bottom portion of the oven liner, said exhaust vent emptying into one of the air channels.

13. A gas cooking oven comprising a box-like oven liner and a front-opening access door forming an oven cooking cavity, an outer oven cabinet surrounding the oven liner and spaced outwardly therefrom to accommodate air channels above and below the oven liner as well as along at least one vertical wall thereof, a combined baking and broiling gas burner arranged adjacent the top wall of the oven liner, conduit means for supplying a gas fuel mixture to the burner, the burner having a horizontal divider forming a top baking zone and a bottom radiant broiling zone, the top zone being furnished with a plurality of gas ports at opposite sides thereof, the bottom zone having an external diaphragm which is heated to incandescence by combustion of the gas fuel mixture, an adjustable valve in the burner having one position for directing the gas fuel mixture to the top zone and another position for directing the gas mixture to the bottom zone, and air inlet means in the top wall of the oven liner for supplying secondary air to the burner, blower means in the air channels for inducing an air flow therethrough, an oven exhaust vent adjacent the bottom portion of the oven liner, and duct means connecting the exhaust vent to the said air channels such that there is a continuous sweep of air through the cooking cavity.

14. A gas cooking oven as recited in claim 13 wherein said duct means is of flattened configuration positioned along the bottom wall and up the back wall and through the top wall of the oven liner to discharge the oven exhaust into the top air channel because of a venturi effect.

* * * * *